United States Patent [19]
Fuki et al.

[11] Patent Number: 5,528,140
[45] Date of Patent: Jun. 18, 1996

[54] ROTATION ANGLE SENSOR FOR INTERNAL COMBUSTION ENGINE HAVING ROTATABLE DETECTION MEANS

[75] Inventors: Naoki Fuki, Anjo; Toyohisa Harita; Kazumi Nakano, both of Kariya, all of Japan

[73] Assignee: Nippondenso Co., Ltd., Kariya, Japan

[21] Appl. No.: 122,163

[22] Filed: Sep. 17, 1993

[30] Foreign Application Priority Data

Sep. 18, 1992 [JP] Japan .................................. 4-249375
May 10, 1993 [JP] Japan .................................. 5-108096

[51] Int. Cl.$^6$ ........................... G01B 7/00; G01B 7/30; F02P 5/00; G01R 33/025
[52] U.S. Cl. ............... 324/207.12; 324/207.25; 123/414
[58] Field of Search .................. 324/207.12, 207.25, 324/173, 174, 207.22, 207.16; 123/414–417, 476, 609, 617

[56] References Cited

U.S. PATENT DOCUMENTS

| | | | |
|---|---|---|---|
| 4,089,316 | 5/1978 | Padgitt | 324/391 |
| 4,531,090 | 7/1985 | Hill | 324/207.25 |
| 4,628,891 | 12/1986 | Asai et al. | |
| 5,027,067 | 6/1991 | Witzig et al. | |
| 5,131,366 | 7/1992 | Rawlings et al. | 123/414 |

FOREIGN PATENT DOCUMENTS

| | | |
|---|---|---|
| 59-134377 | 8/1984 | Japan . |
| 60-174048 | 9/1985 | Japan . |
| 63-48110 | 4/1988 | Japan . |
| 3-12501 | 1/1991 | Japan . |

Primary Examiner—Walter E. Snow
Attorney, Agent, or Firm—Cushman Darby & Cushman

[57] ABSTRACT

A rotation angle sensor has a cylindrical rotating member attached to a cam shaft of an internal combustion engine for rotation therewith, and a pickup. The rotating member has a portion formed on its inner peripheral surface for detection of a crank angle. The pickup has a column-shaped support portion and is attached coaxially with the rotating member with the support portion rotatably inserted into a hole which is formed in a casing of the internal combustion engine. A detecting portion provided at a distal end of the support portion is positioned inside the rotating member to detect a position of the crank angle detection portion during rotation of the rotating member and output a signal. The pickup further has an arc-shaped elongate hole which is formed to extend about a central axis of the support portion, so that the pickup is fixed to the casing of the internal combustion engine with a bolt inserted through the elongate hole. The pickup, by loosening the bolt, is easily turned to change its angular position with respect to the rotating member. Thus, ignition timing of the internal combustion engine, which is controlled based on the signal from the rotation angle sensor, can be easily adjusted and the structure for the adjustment is simple and inexpensive.

16 Claims, 8 Drawing Sheets

ROTATION ANGLE SENSOR FOR INTERNAL COMBUSTION ENGINE HAVING ROTATABLE DETECTION MEANS

BACKGROUND OF THE INVENTION

The present invention relates to a rotation angle sensor for use in control of fuel injection and ignition timing of an internal combustion engine.

Recently, internal combustion engines are provided with electronic units for controlling fuel injection and ignition timing. This type electronic unit includes a rotation angle sensor which detects a crank position of the internal combustion engine, for determining fuel injection and ignition timing of the internal combustion engine on the basis of the information.

A typical rotation angle sensor has a rotating member adapted to rotate in synchronism with an internal combustion engine, and a stationary pickup opposing to the rotating member, and is so formed as to detect a crank angle of the internal combustion engine through changes of magnetic flux caused on the pickup upon rotation of the rotating member. Such a rotation angle sensor is disclosed in, for example, Japanese Patent Unexamined Publication No. 60-174048, which corresponds to U.S. Pat. No. 4,628,891, and Japanese Patent Unexamined Publication No. 3-12501 which corresponds to U.S. Pat. No. 5,027,067.

Conventionally, a rotation angle sensor is attached to a crankshaft or cam shaft of an internal combustion engine to detect rotation of the shaft. The rotation angle sensor is rather preferably attached to the cam shaft, because the cam shaft is usually provided at a top of the internal combustion engine and easy access for assembly or service is ensured. In most of internal combustion engines, however, a cam shaft and a crankshaft are coupled to each other by a timing belt or chain. For this reason, the cam shaft is deviated in phase with respect to the crankshaft within the range of manufacture accuracy of a coupling drive member. As a result, due to such a deviation of phase of the cam shaft with respect to the crankshaft, the rotation angle sensor attached to the cam shaft cannot always detect the crank position accurately, which causes an error in initial setting of the ignition timing.

With a view of compensating for such an error in initial setting of the ignition timing, for example, Japanese Utility Model Unexamined Publication No. 63-48110 discloses a mechanical ignition timing adjusting mechanism and Japanese Patent Unexamined Publication No. 59-134377 discloses an electrical ignition timing adjusting mechanism. However, any of the disclosed mechanisms is complicated in structure and requires a relatively expensive production cost.

SUMMARY OF THE INVENTION

The present invention has an object of providing a rotation angle sensor which is simple in structure for adjustment, enables easy adjustment, and is not extremely expensive to produce.

Another object of the invention is to provide a rotation angle sensor which is simple in structure for adjustment and functions positively even when lubricating oil or the like of an internal combustion engine enters therein.

To achieve the above objects, the invention is intended for the structure and attachment by which a pickup of the rotation angle sensor can be easily rotated with respect to a rotating member. The invention is also intended for the structure of the rotating member by which entered lubricating oil or the like can be surely discharged.

According to the invention, a rotation angle sensor for an internal combustion engine comprises a rotating member adapted to be connected to a rotating part of the internal combustion engine for synchronous rotation therewith, a pickup, and means for fixing the pickup to a casing of the internal combustion engine at a desired rotational position of the pickup. The rotating member is of a cylindrical shape having an inner bore, and has at least one portion provided on a peripheral surface of the inner bore for detecting a crank angle. The pickup includes a support portion and detection means for detecting a position of the crank angle detecting portion during rotation of the rotating member and outputting an electric signal. The support portion is shaped to be rotatably inserted into a hole formed in the casing of the internal combustion engine in coaxial relation to the rotating member. The detection means is carried on the support portion to be positioned inside the rotating member.

It is preferable that the support portion of the pickup is formed into a column shape integrally with the detecting portion by using resin material. In this case, it is very easy to form the pickup and the attachment hole in the casing of the internal combustion engine, and to attach the pickup in place. Additionally, the pickup can be adjusted in its position with respect to the rotating member just by rotating the support portion in the attachment hole of the internal combustion engine.

The means for fixing the pickup preferably comprises a fixing portion formed integrally with the pickup, and a bolt. The fixing portion has an arc-shaped elongate hole which is formed to extend about a central axis of the support portion, and the bolt is fastened to the casing of the internal combustion engine through the elongate hole. This results in a simple structure and also enables the pickup to be easily fixed or released.

The rotating member is preferably formed with a plurality of holes which each penetrate from the inner bore to an outer periphery thereof, or the inner bore of the rotating member is preferably tapered such that its inner diameter gradually increases toward an opening end of the inner bore. In the former case, it is preferable that the holes are formed at positions in the inner bore where distances from the center of rotation of the rotating member are maximum. Oil of the internal combustion engine and metal powder or the like contained in the oil, which have entered the inside of the rotating member, can be surely discharged through the plural holes or along a tapered wall surface of the inner bore due to centrifugal forces upon rotation of the rotating member. It is therefore possible to prevent metal powder or the like from collecting inside the rotating member and changing a gap between the rotating member and the detecting portion of the pickup. As a result, the rotation angle sensor can always operate satisfactorily.

With the rotation angle sensor of the invention, the pickup is easily rotatable about a central axis of the rotating member and adjustment of its position with respect to the rotating member is easy. The structure for the above end is very simple and any expensive production cost is not required.

BRIEF DESCRIPTION OF THE DRAWINGS

FIG. 1A is a side view of a pickup of the sensor and FIG. 1B is a vertical sectional view of the entire sensor;

DESCRIPTION OF THE EMBODIMENTS

Embodiments of the invention will be now described with reference to the attached drawings.

Figure 1B:
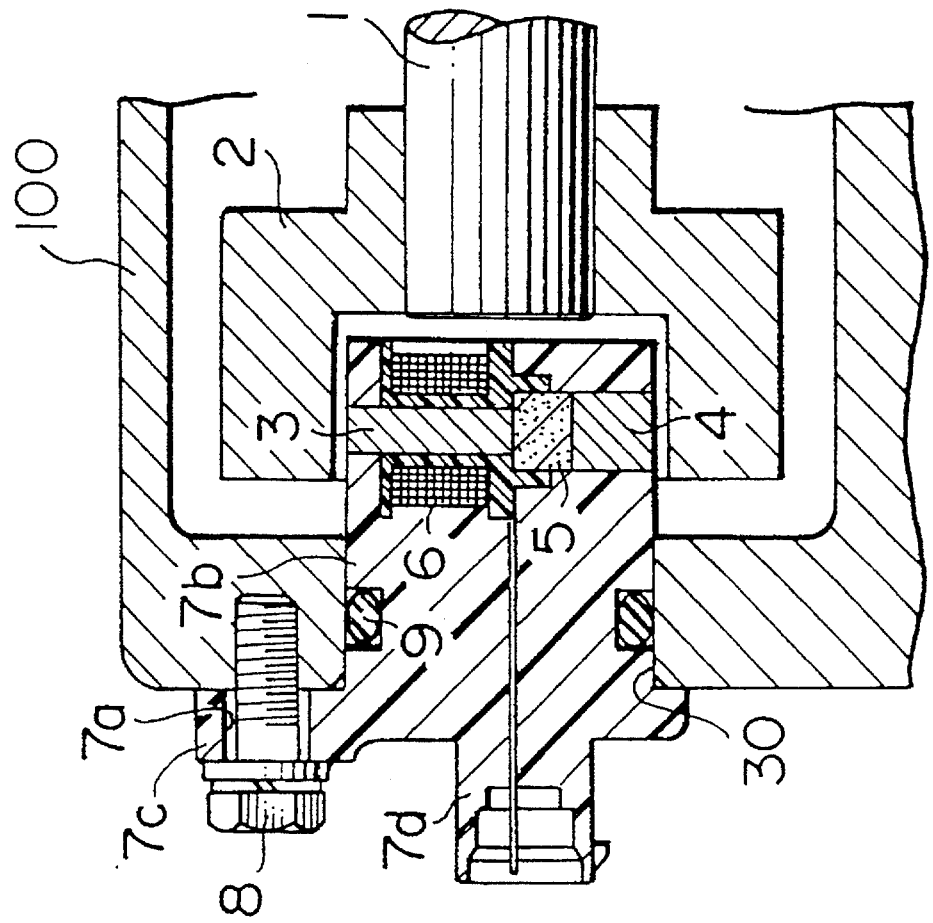
FIGS. 1A and 1B show a rotation angle sensor according to an embodiment of the invention.
Figure 1A:
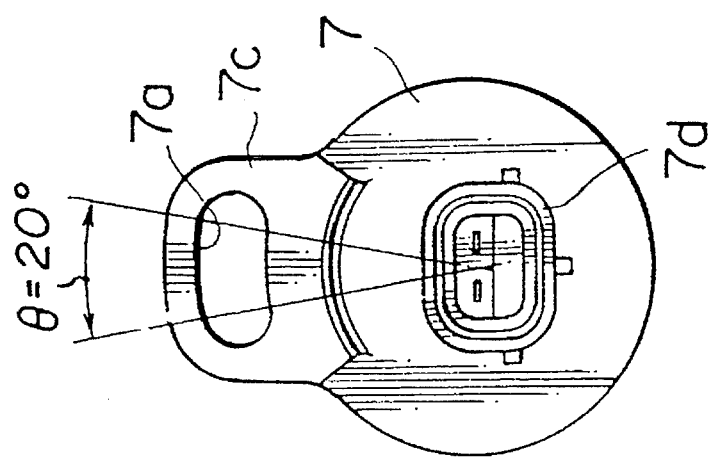
Figure 2:
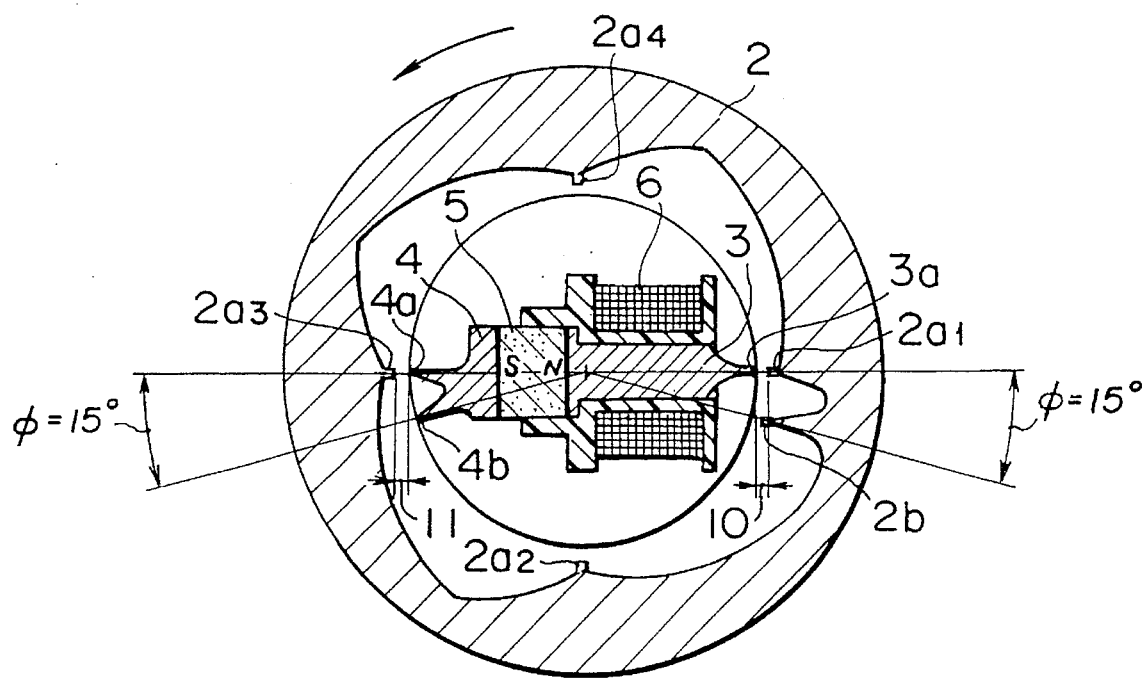
FIG. 2 is a cross-sectional view of the sensor of FIG. 1.

FIGS. 1A and 1B schematically show the structure of a rotation angle sensor according to an embodiment of the invention, and the rotation angle sensor has a capability of discriminating cylinders of a 4-cylinder internal combustion engine. FIG. 2 shows a crank angle detecting portion of the rotation angle sensor of FIG. 1.

In FIG. 1, reference numeral 1 denotes a cam shaft of the internal combustion engine. The cam shaft 1 makes a turn every time a crankshaft (not shown) of the internal combustion engine rotates twice. The rotation angle sensor includes a cylindrical rotating member 2. The rotating member 2 is formed of a magnetic material and directly fixed to the cam shaft 1. In this embodiment, the rotating member 2 rotates in a direction of arrow shown in FIG. 2 together with the cam shaft.

The rotating member 2 has a bore which is formed at its center and shaped as shown in FIG. 2. On an inner surface of the bore, there are provided projections 2a for detecting a crank angle of the internal combustion engine and a projection 2b for discriminating the cylinders. The projections 2a are provided in the same number as the cylinders of the internal combustion engine, i.e., four in this embodiment. These four projections 2a are arranged in a circumferential direction of the rotating member 2 at equal intervals, i.e., 90 degrees in this embodiment, and functions as members to be detected for determining the crank angle. On the other hand, the projection 2b is provided one at a position which is delayed from any one of the projections 2a in a direction of rotation of the rotating member by a predetermined angle φ, i.e., 15 degrees in this embodiment, and serves as a member to be detected for discriminating the cylinders.

As to the crank angle detecting projections 2a, for convenience of description, the projection close to the projection 2b for discriminating the cylinders is referred to as a first projection $2a_1$ in this specification, and the remaining projections are referred to as a second projection $2a_2$, a third projection $2a_3$ and a fourth projection $2a_4$, respectively, in this order along a direction opposite to the rotation of the rotating member.

The rotation angle sensor further includes first and second detection members 3, 4 and a permanent magnet 5. The first and second detection members 3, 4 are each formed of a magnetic material. As shown in FIG. 2, the second detection member 4 is bifurcated at its distal end, and the first detection member is shaped to have a pointed distal end. The first and second detection members 3, 4 are opposite to each other so that their distal ends face the inner peripheral surface of the rotating member 2. The permanent magnet 5 is positioned between the first and second detection members 3, 4, and is in contact at their opposite polarities with those detection members, respectively. In other words, the first and second detection members 3, 4 are arranged in a magnetizing direction of the permanent magnet 5. The detection members 3, 4 and the permanent magnet 5 are situated in the bore of the rotating member 2 in alignment with each other such that a common axis of the detection members and the permanent magnet lies vertically to a central axis of the rotating member 2. Accordingly, magnetic flux of the permanent magnet 5 passes along a path of permanent magnet 5→first detection member 3→rotating member 2→second detection member 4→permanent magnet 5.

Figure 3:
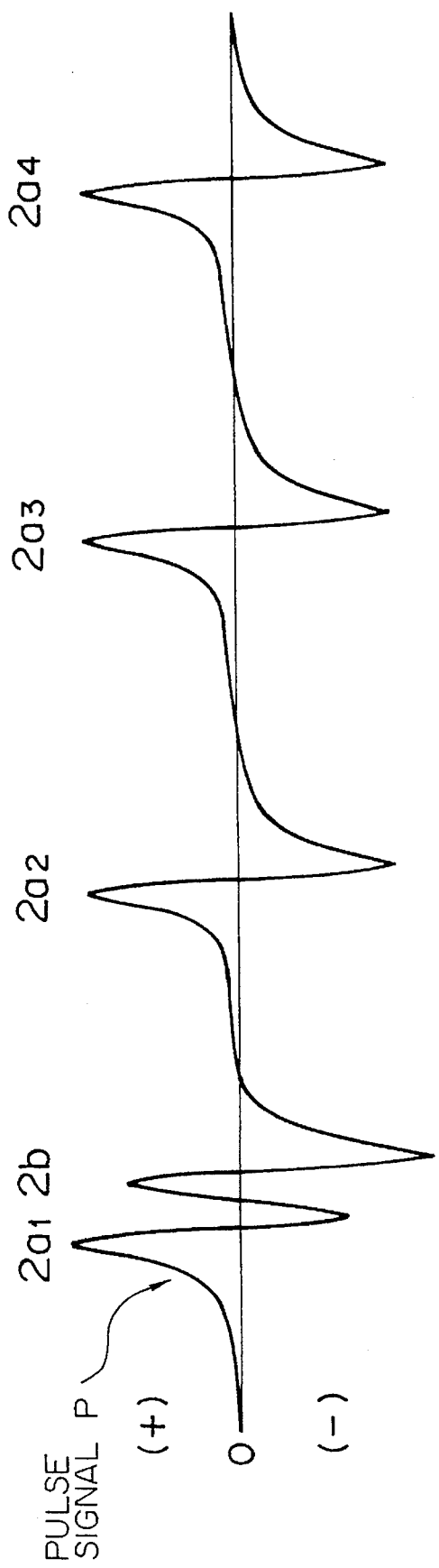
FIG. 3 is a diagram showing the waveform of a signal output from the sensor of FIG. 1.

A pickup coil 6 is wound around an outer periphery of the first detection member 3. In FIG. 2, when the rotating member 2 rotates in the direction of arrow, the crank angle detecting projections 2a and the cylinder discriminating projection 2b pass a projection 3a provided at the distal end of the first detection member 3. Then changes of magnetic flux occur in the first detection member 3, and the pickup coil 6 senses the changes of magnetic flux as changes of a voltage value and produces a pulse signal P as shown in FIG. 3. The pulse signal P will be described later.

The first and second detection members 3, 4, the permanent magnet 5, and the pickup coil 6 are integrally molded by using resin material to constitute a column-shaped pickup 7. The pickup 7 is fixed to a hole 30 by means of a bolt 8, which is formed in a cylinder head casing or cover 100 of the internal combustion engine. In order to prevent oil leak from the internal combustion engine, an O-ring 9 is fitted around the pickup 7 to seal between the pickup and the cylinder head cover 100 of the internal combustion engine.

This embodiment is featured in that the pickup 7 molded into one united body by using the resin material, a support portion 7b of the pickup 7 for attachment to the internal combustion engine is in the shape of a column, and further the pickup 7 is inserted into the circular hole 30 in the cylinder head cover 100 of the internal combustion engine. Additionally, as shown in FIG. 1A, the pickup 7 is provided at its outer periphery with a fixing portion 7c which projects radially outwardly of the support portion 7b. The fixing portion 7c is molded integrally with the pickup 7 by using the resin material, and has an elongate hole 7a perforated for insertion of the bolt 8 therethrough. The elongate hole 7a is arc-shaped about a central axis of the pickup 7 to extend over a range θ of ignition timing adjustment, i.e., θ=20° in this embodiment.

In addition to the structure for attaching the pickup 7 as described above, the circular hole 30 of the internal combustion engine is formed such that its inner diameter is somewhat larger than an outer diameter of the support portion 7b of the pickup 7 with the center of the circular hole 30 aligned with the central axis of the rotating member 2. Accordingly, if there occurs any error in initial setting of the ignition timing of the internal combustion engine, the error is compensated for by loosening the bolt 8 and turning the pickup 7 within the range 8 of the elongate hole 7a. Thus, the pickup 7 can smoothly turn in the circular hole 30 via the O-ring 9 about the same central axis as the rotating member 2, enabling easy adjustment of initial setting of the ignition timing.

The pickup 7 further has, at its outer end, a connector 7d which is integrally formed by using the resin material to take a voltage out of the pickup coil 6 to the outside.

FIG. 3 shows the waveform of the pulse signal P output from the pickup coil 6 upon rotation of the rotating member 2. As will be seen from FIG. 3, characteristics of the pulse signal are such that it takes maximum voltage values on the positive side just before the crank angle detecting projections $2a_i$ (i=1–4) and the cylinder discriminating projection 2b on the inner peripheral surface of the rotating member 2 reach the projection 3a of the first detection members 3, and it takes minimum voltage values on the negative side just after the projections $2a_i$ (i=1–4) and the projection 2b have passed the projection 3a of the first detection member 3. In FIG. 3, reference numerals affixed to the pulse signal P correspond to the crank angle detecting projections $2a_i$ (i=1–4) and the cylinder discriminating projection 2b.

As described above, the second detection member 4 is bifurcated at its distal end to provide a sub-projection 4b as well as a main projection 4a. The sub-projection 4b serves to detect the cylinder discriminating projection 2b on the inner peripheral surface of the rotating member 2. The sub-projection 4b is so positioned as to face the third crank angle detecting projection $2a_3$ when the projection 3a of the first detection member 3 faces the projection 2b. In other words, an angular distance δ between the main and sub-projections 4a, 4b of the second detection member 4 is set equal to the angular distance φ between the first crank angle detecting projection $2a_1$ and the cylinder discriminating projection 2b. In this embodiment, the angles φ, δ are 15°.

With the above arrangement of the projections of the second detection member 4, when the projection 3a of the first detection member 3 faces any one of the crank angle detecting projections $2a_i$ (i=1–4) and the cylinder discriminating projection 2b, either the projection 4a or 4b of the second detection member 4 faces any one of the projections $2a_i$ (i=1–4). As a result, the cylinder discriminating projection 2b can be detected efficiently.

On the other hand, an absolute value of the voltage of the pulse signal P is proportional to changes of magnetic flux caused in the first detection member 3. Generally, an absolute value of the voltage increases as a gap 10 between the projection 3a of the first detection member 3 and the projection $2a_i$ (i=1–4) or the projection 2b on the inner peripheral surface of the rotating member 2 is narrowed. In this embodiment, because the second detection member 4 is disposed on the side opposite to the first detection member 3, a gap 11 between the projection 4a or 4b of the second detection member 4 and the projection $2a_i$ (i=1–4) or the projection 2b takes a value inversely proportional to that of the gap 10. That is, the sum of the gap 10 and the gap 11 is constant. Accordingly, if there occurs any error in the attachment positions of the first and second detection members 3, 4 due to accuracy of manufacture or other reasons, the sum of the gap 10 and the gap 11 is not varied, but held constant, resulting in an advantage that the voltage value of the pulse signal P is always stable.

In the above-described embodiment, two projections, i.e., the main and sub-projections 4a, 4b, are provided on the outer end of the second detection member 4 with the predetermined angular distance δ therebetween. However, a single projection may be provided to extend over a range of the angle δ or the larger angle. In this case, substantially the same advantage can also be obtained.

Rotation angle sensors according to other embodiments of the invention will be described below with reference to FIGS. 4 to 13.

Figure 4:
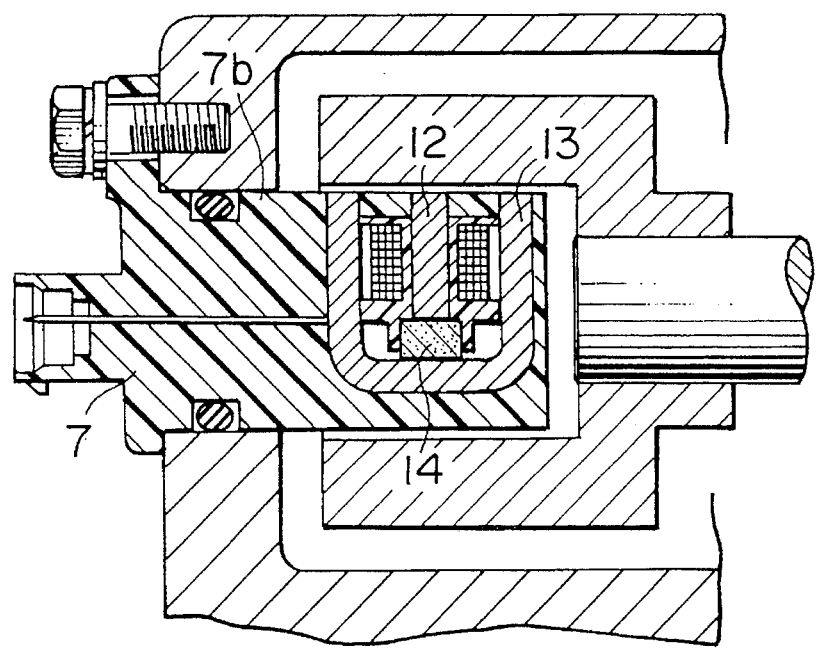
FIGS. 4 to 6 are vertical sectional views showing rotation angle sensors according to other embodiments of the invention, respectively.
Figure 5:
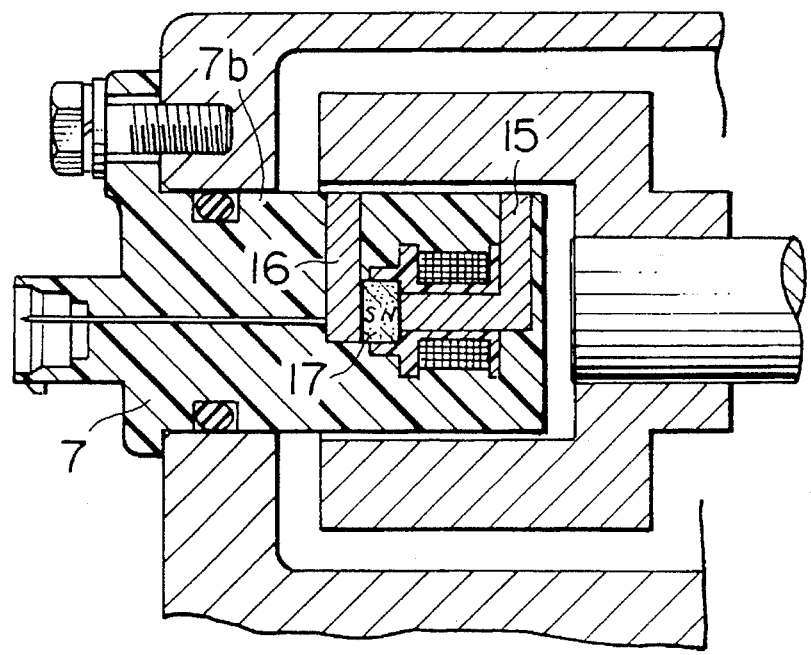

A rotation angle sensor shown in FIG. 4 also has a similar pickup 7. In this pickup 7, however, an I-shaped first detection member 12, a U-shaped second detection member 13 and a permanent magnet 14 are combined to form an E-shaped magnetic path in an axial direction. On the other hand, in a pickup 7 of a rotation angle sensor shown in FIG. 5, an L-shaped first detection member 15, an I-shaped second detection member 16 and a permanent magnet 17 are combined to form a C-shaped magnetic path in an axial direction. In both the embodiments of FIGS. 4 and 5, a support portion 7b for attaching the pickup 7 to the internal combustion engine is in the shape of a column as with the first embodiment, with the result of similar advantages.

Figure 6:
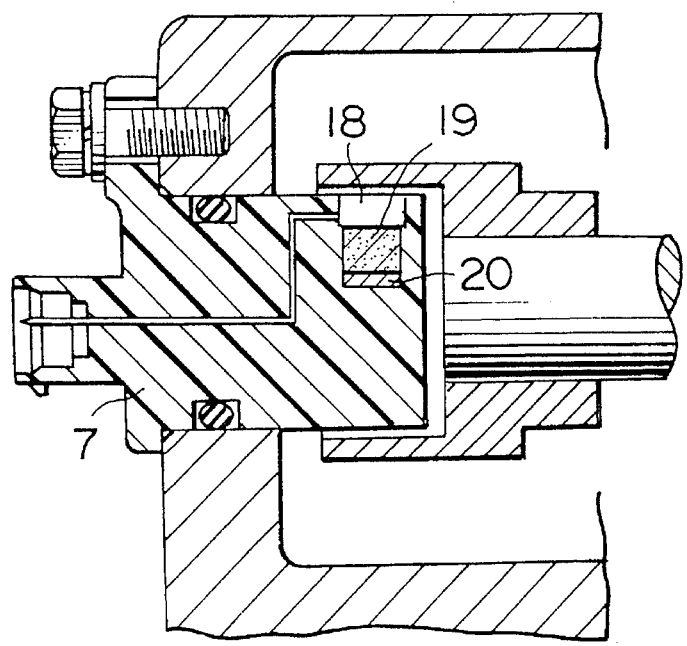

A rotation angle sensor shown in FIG. 6 has a Hall element 18 which is provided in a detecting portion of a pickup 7 instead of the magnetic detection members in the first embodiment. In FIG. 6, reference numeral 19 denotes a permanent magnet and 20 denotes a core member, but a control circuit is not shown. The remaining structure of this embodiment is substantially the same as that of the first embodiment, and the rotation angle sensor of FIG. 6 can also provide similar advantages to those of the first embodiment. Additionally, the Hall element 18 requires a small space for installation, enabling a reduction in size of the rotation angle sensor. It is needless to say that the similar advantages can also be obtained even when a magnetic resistance element is used instead of the Hall element 18.

Meanwhile, it may happen that oil for the internal combustion engine enters the inside of the described rotating member 2 and metal powder or the like contained in the oil remains in the rotating member 2. This possibly raises a fear that the gaps between the projections of the first and second detection members 3, 4 and the inner peripheral surface of the rotating member 2 are deviated from initial setting values due to the presence of metal powder or the like, and the voltage waveform of the pulse signal P is so changed as to disable accurate detection of the crank angle.

Figure 7:
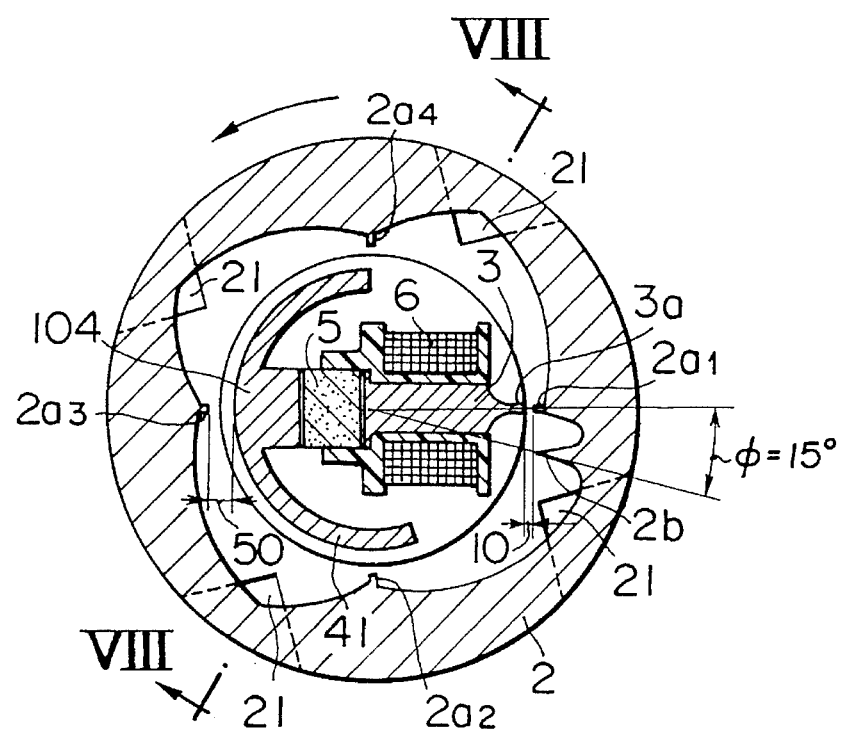
FIG. 7 is a cross-sectional view showing a rotation angle sensor according to still another embodiment of the invention.
Figure 8:
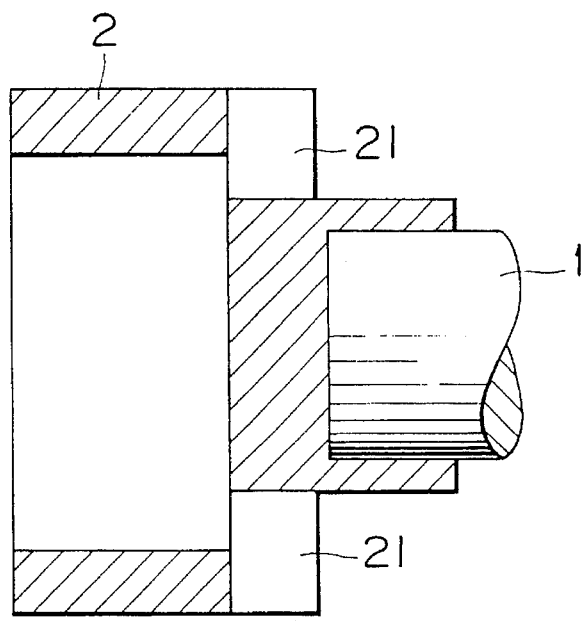
FIG. 8 is a sectional view of a rotating member of the sensor taken along line VIII—VIII in FIG. 7.

To prevent the above drawback, the embodiment shown in FIGS. 7 and 8 is so constructed that a rotating member 2 has four holes 21 perforated therein to discharge metal powder or the like in the oil from the inside of the rotating member 2. Each of the holes 21 is formed by cutting work or the like to penetrate from the bottom of the inner bore of the rotating member 2 to the outer peripheral surface thereof. These holes 21 are disposed between the two adjacent projections 2b and $2a_2$, $2a_2$ and $2a_3$, $2a_3$ and $2a_4$, and $2a_4$ and $2a_1$ on the inner peripheral surface of the rotating member 2, respectively, at positions where distances from the center of rotation of the rotating member 2 to the inner peripheral surface thereof are maximum. This is because if metal powder or the like enters the rotating member 2, it tends to gather in farther positions from the center of rotation of the rotating member 2 due to centrifugal forces during the rotation. The holes 21 formed at such positions can serve to efficiently discharge the metal powder or the like to the outside and prevent it from remaining inside the rotating member 2.

As shown in FIG. 7, this embodiment is further provided with a single arc-shaped projection 41 at an outer end of a second detection member 104. The arc-shaped projection 41 is formed such that it faces the projections $2a_i$ (i=2–4) with a predetermined gap 50 when the projection 3a of the first detection member 3 faces the cylinder discriminating projection 2b. Therefore, at the time when the projection 3a of the first detection member 3 is aligned with the cylinder discriminating projection 2b, the second detection member 104 faces the three projections $2a_2$, $2a_3$, $2a_4$ and the magnetic flux passing through the first detection member 3 is increased. Accordingly, an output value of the pulse signal P produced when the cylinder discriminating projection 2b passes the projection 3a of the first detection member 3 increases, making it possible to discriminate the cylinders more surely. The other structure of the embodiment of FIG. 7 is similar to that of the first embodiment, and will not be described here just by denoting corresponding parts with the same reference numerals.

The rotating member 2 may be structured as shown in FIGS. 9 to 12 to remove metal powder or the like in oil.

Figure 9:
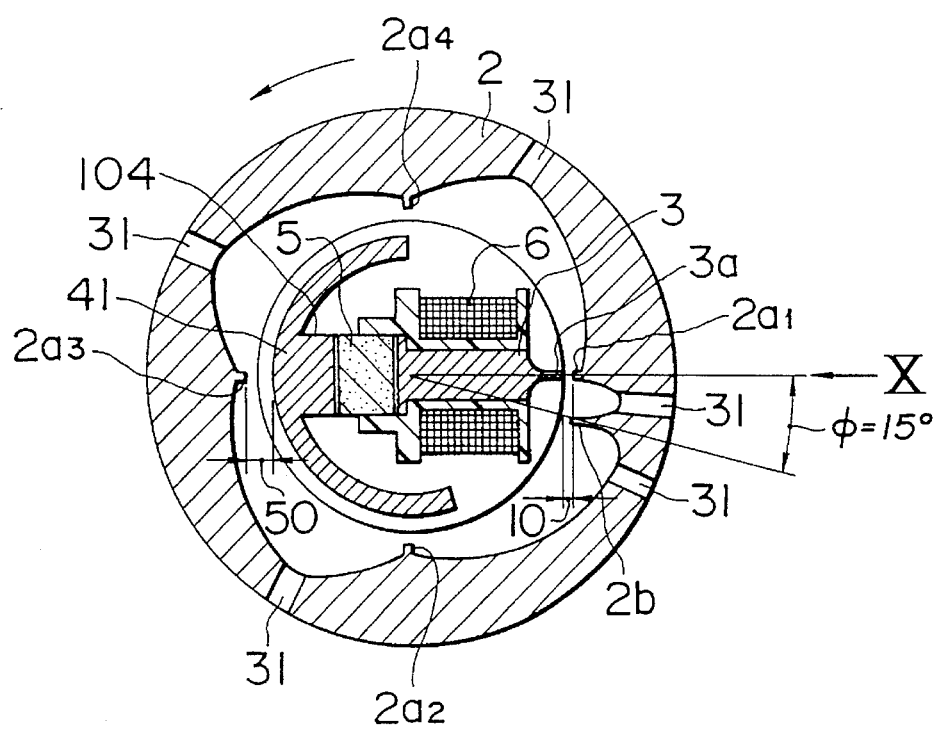
FIG. 9 is a cross-sectional view showing a rotation angle sensor according to still another embodiment of the invention.
Figure 10:
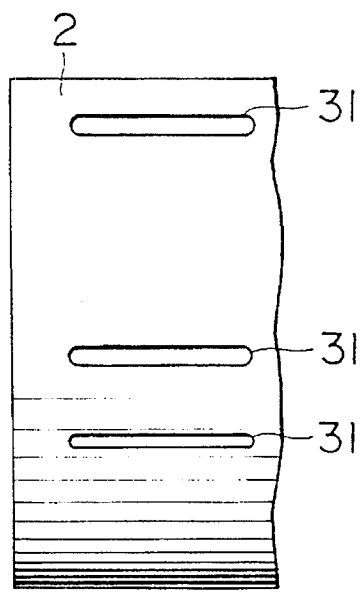
FIG. 10 is a side view of a rotating member of the sensor as viewed in the direction of arrow X in FIG. 9.

In a rotation angle sensor shown in FIGS. 9 and 10, the rotating member 2 has four holes 31. Each of the holes 31 is formed to be elongate in an axial direction and to radially penetrate through part of a tubular wall of the rotating member 2. As with the holes 21 in the embodiment of FIG. 7, these holes 31 are disposed between the two adjacent projections 2b and $2a_2$, $2a_2$ and $2a_3$, $2a_3$ and $2a_4$, $2a_4$ and $2a_1$, and $2a_1$ and 2b on the inner peripheral surface of the rotating member 2, respectively, at positions where distances from the center of rotation of the rotating member 2 to the inner peripheral surface thereof are maximum. With this arrangement, the holes 31 can serve to efficiently discharge metal powder or the like, which tends to collect between the projections of the rotating member 2, to the outside due to centrifugal forces during the rotation and prevent it from remaining inside the rotating member 2.

Figure 11:
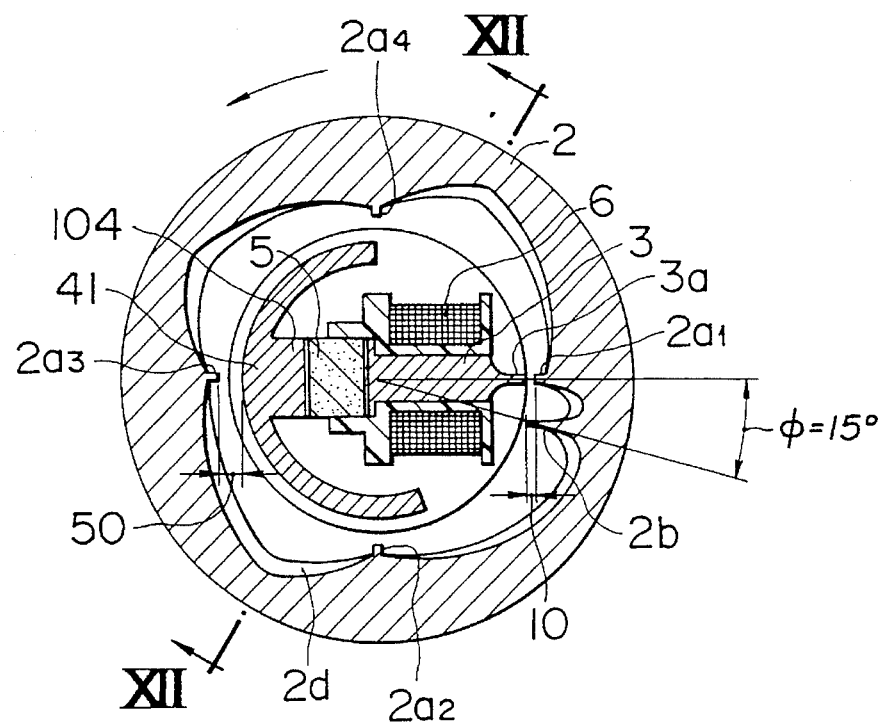
FIG. 11 is a cross-sectional view showing a rotation angle sensor according to still another embodiment of the invention.
Figure 12:
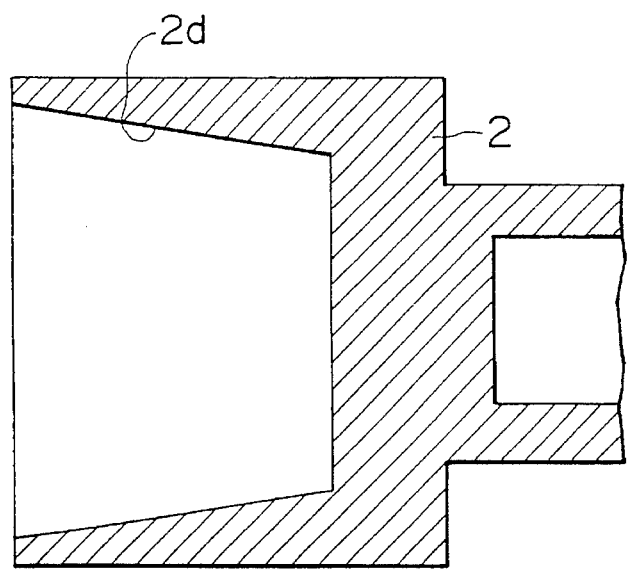
FIG. 12 is a sectional view of a rotating member of the sensor taken along line XII—XII in FIG. 11.

In the embodiment shown in FIGS. 11 and 12, an inner bore 2d of the rotating member 2 is tapered such that its inner diameter gradually increases from the closed bottom of the inner bore to an opening end thereof. Metal powder or the like collecting inside the rotating member 2 is expelled along a tapered wall surface of the inner bore 2d due to centrifugal forces produced during the rotation and discharged to the outside through the opening end. Thus, this embodiment can also efficiently remove foreign matters in the rotating member 2.

Figure 13:
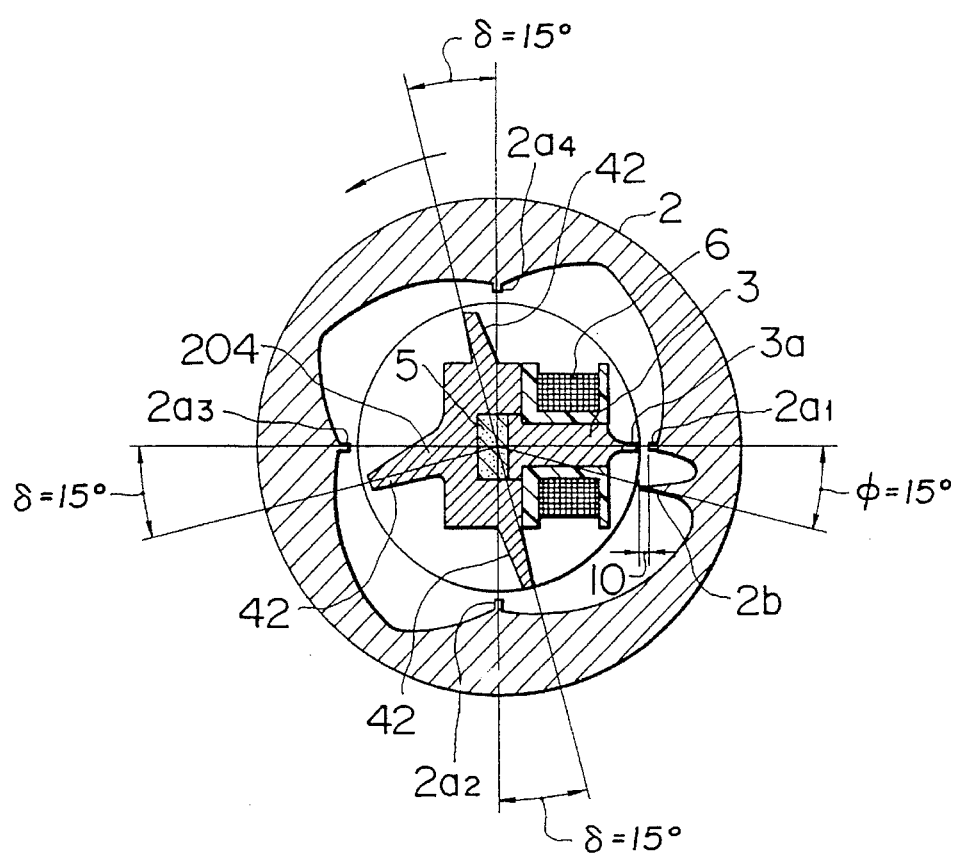
FIG. 13 is a cross-sectional view showing a rotation angle sensor according to still another embodiment of the invention.

FIG. 13 shows a rotation angle sensor according to still another embodiment of the invention. This embodiment is of the same structure as the first embodiment except that a second detection member 204 has a different shape. The second detection member 204 is formed with three projections 42. These projections 42 are so arranged as to face the crank angle detecting projections $2a_i$ (i=2–4) with a predetermined gap 50, respectively, when the projection 3a of the first detection member 3 is aligned with the cylinder discriminating projection 2b.

According to this embodiment, similarly to the embodiment in which the second detection member has the arc-shaped projection, an output value of the pulse signal P produced when the cylinder discriminating projection 2b passes the projection 3a of the first detection member 3 is increased, making it possible to discriminate the cylinders more positively.

It should be understood that while the invention has been described in connection with the embodiments, the invention is not limited solely to those specific forms, but various modifications can be made on the above-described forms and the invention can be embodied in other forms without departing from the scope of the attached claims.

By way of example, the detecting portion of the pickup is not limited to the above-described types using magnetic members, a Hall sensor and a magnetic resistance element, but may be of the optical type having a photo-diode and a phototransistor. Also, while the above embodiments have been described as outputting both cylinder number pulses and cylinder discriminating pulses, the invention is also applicable to a rotation angle sensor outputting only the cylinder number pulses, or a rotation angle sensor for detecting the crank angle of each cylinder more finely.

What is claimed is:

1. A rotation angle sensor for an internal combustion engine comprising:

a rotating member connected to a rotating part of the internal combustion engine for synchronous rotation therewith, said rotating member being of a cylindrical shape having an inner bore, and having at least one portion provided on a peripheral surface of said inner bore for detection of a crank angle;

a pickup including a support portion and detection means for detecting a position of said crank angle detection portion during rotation of said rotating member and outputting an electric signal, said support portion being shaped to be rotatably inserted into a hole formed in a casing of the internal combustion engine and to be guided by a guiding surface formed in the casing, said guiding surface being formed in coaxial relation to said rotating member, said detection means being carried on said support portion to be positioned inside said rotating member; and means for fixing said pickup to the casing of the internal combustion engine at a desired rotational position of said pickup, the support portion being rotatable while being guided by the guiding surface of the casing, so that the support portion can be rotated under guidance of the guiding surface to change a rotational position where the electric signal is output from the detection means.

2. The sensor according to claim 1, wherein said support portion is in a column shape, and said fixing means comprises an arc-shaped elongate hole formed in said pickup to extend about a central axis of said support portion and a bolt fastened to the casing of the internal combustion engine through said elongate hole.

3. The sensor according to claim 1, wherein said rotating member further has at least one portion provided on the peripheral surface of said inner bore for discriminating cylinders of the internal combustion engine.

4. The sensor according to claim 3, wherein said rotating member is formed of a magnetic material, said crank angle detecting portion comprises first projections which are equal in number to the cylinders of the internal combustion engine, said first projections are spaced from one another in a circumferential direction of said rotating member with equal angular intervals, said portion for discriminating the cylinders of the internal combustion engine comprises second projections which are smaller in number than said first projections, said second projections are spaced from said first projections with a predetermined angular interval, respectively, said detection means includes a permanent magnet, first and second detection members both formed of a magnetic material and a pickup coil wound around one of said first and second detection members, said first and second detection members are disposed on both sides of said permanent magnet in alignment with each other such that said first and second detection members and said permanent magnet have a common axis vertical to an axis of rotation of said rotating member, said first detection member is formed with a single projection at its outer end radially of said rotating member, and said second detection member is formed at its outer end radially of said rotating member with at least one projection which, when said projection of said first detection member is aligned with one of said first projections and said second projections, faces one of the remaining first projections.

5. The sensor according to claim 4, wherein said second detection member is provided at its outer end with two projections spaced from each other by a predetermined angular interval.

6. A rotation angle sensor for an internal combustion engine comprising:

a rotating member connected to a rotating part of the internal combustion engine for synchronous rotation therewith, said rotating member being formed of a magnetic material, being of a cylindrical shape having an inner bore, and having at least one portion for detection of an crank angle and at least one portion for discriminating cylinders of the internal combustion engine which portions are provided on a peripheral surface of said inner bore;

a pickup including a support portion and detection means for detecting a position of said crank angle detection portion during rotation of said rotating member and outputting an electric signal, said support portion being in a column shape to be rotatably inserted to a hole formed in a casing of the internal combustion engine in coaxial relation to said rotating member, said detection means being carried on said support portion to be positioned inside said rotating member;

means for fixing said pickup to the casing of the internal combustion engine;

said crank angle detection portion comprising first projections equal in number to the cylinders of the internal combustion engine, said first projections being spaced from one another in a circumferential direction of said rotating member with equal angular intervals;

said portion for discriminating the cylinders of the internal combustion engine comprising second projections smaller in number than said first projections, said second projections being spaced from said first projections with a predetermined angular interval, respectively;

said detection means including a permanent magnet, first and second detection members both formed of a magnetic material and a pickup coil wound around one of said first and second detection members, said first and second detection members being arranged on both sides of said permanent magnet in alignment with each other such that said first and second detection members and said permanent magnet have a common axis vertical to an axis of rotation of said rotating member, said first detection member being formed with a single projection at its outer end radially of said rotating member, said second detection member being formed at its outer end radially of said rotating member with at least one projection which, when said projection of said first detection member is aligned with one of said first projections and said second projections, faces one of the remaining first projections.

7. The sensor according to claim 6, wherein said second detection member is provided at its outer end with two projections which are spaced from each other at a predetermined angular interval.

8. The sensor according to claim 6, wherein said second detection member is formed a single projection at its outer end, and said projection of said second detection member has an arc-shaped portion extending over a predetermined angular distance about an axis of rotation of said rotating member.

9. The sensor according to claim 6, wherein said fixing means comprises a fixing portion having an arc-shaped elongate hole and a bolt fastened to the casing of the internal combustion engine through said elongate hole, said fixing portion is formed integrally with said pickup by a resin material to extend radially outwardly from an end of said support portion on a side opposite to said detection means, and said arc-shaped elongate hole extends about a central axis of said support portion.

10. The sensor according to claim 9, wherein said pickup further comprises a connector for taking out a voltage produced in said pickup coil as said electric signal, and said connector is formed integrally with the end of said support portion by the resin material.

11. The sensor according to claim 6, wherein said rotating member has an end which is adapted to be fixedly attached to a cam shaft of the internal combustion engine, and a plurality of holes, said inner bore has a bottom closing said inner bore on the same side as said fixed end of said rotating member, and said plurality of holes are formed to each penetrate from said bottom of said inner bore to an outer peripheral surface of said rotating member.

12. The sensor according to claim 6, wherein said rotating member has an end which is adapted to be fixedly attached to a cam shaft of the internal combustion engine, and a plurality of holes, said inner bore has a bottom closing said inner bore on the same side as said fixed end of said rotating member, and said plurality of holes are each formed to radially penetrate through a tubular wall of said rotating member at positions between adjacent twos of said first projections.

13. The sensor according to claim 6, wherein said rotating member has an end which is adapted to be fixedly attached to a cam shaft of the internal combustion engine, said inner bore of said rotating member has a bottom closing said inner bore on the same side as said fixed end of said rotating member, and said inner bore is tapered such that its inner diameter gradually increases from said bottom toward an opening end of said inner bore.

14. The sensor according to claim 6, wherein said second detection member is formed with a plurality of projections which are arranged such that when said projection of said first detection member is aligned with one of said first projections and said second projections, the plurality of projections of said second detection member respectively face the remaining first projections.

15. A rotation angle sensor for an internal combustion engine comprising:

a rotating member connected to a rotating part of the internal combustion engine for synchronous rotation therewith, said rotating member being of a cylindrical shape having an inner bore, and having at least one portion provided on a peripheral surface of said inner bore for detection of a crank angle;

a pickup including a support portion and detection means for detecting a position of said crank angle detection portion during rotation of said rotating member and outputting an electric signal, said support portion being shaped to be rotatably inserted into a hole formed in a casing of the internal combustion engine and to be guided by a guiding surface formed in the casing, said guiding surface being formed in coaxial relation to said rotating member, said detection means being carried on said support portion to be positioned inside said rotating member; and means for fixing said pickup to the casing of the internal combustion engine at a desired rotational position of said pickup, wherein said rotating member further has at least one portion provided on the peripheral surface of said inner bore for discriminating cylinders of the internal combustion engine, wherein said rotating member is formed of a magnetic material, said crank angle detecting portion comprises first projections which are equal in number to the cylinders of the internal combustion engine, said first projections are spaced from one another in a circumferential direction of said rotating member with equal angular intervals, said portion for discriminating the cylinders of the internal combustion engine comprises second projections which are smaller in number than said first projections, said second projections are spaced from said first projections with a predetermined angular interval, respectively, said detection means includes a permanent magnet, first and second detection members both formed of a magnetic material and a pickup coil wound around one of said first and second detection members, said first and second detection members are disposed on both sides of said permanent magnet in alignment with each other such that said first and second detection members and said permanent magnet have a common axis vertical to an axis of rotation of said rotating member, said first detection member is formed with a single projection at its outer end radially of said rotating member, and said second detection member is formed at its outer end radially of said rotating member with at least one projection which, when said projection of said first detection member is aligned with one of said first projections and said second projections, faces one of the remaining first projections.

16. The sensor according to claim 15, wherein said second detection member is provided at its outer end with two projections spaced from each other by a predetermined angular interval.

* * * * *